United States Patent
Kawaguchi et al.

(10) Patent No.: US 8,942,855 B2
(45) Date of Patent: Jan. 27, 2015

(54) POWER DISTRIBUTION SYSTEM

(75) Inventors: Kei Kawaguchi, Osaka (JP); Hiroaki Koshin, Osaka (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 13/508,061

(22) PCT Filed: Oct. 28, 2010

(86) PCT No.: PCT/IB2010/002749
§ 371 (c)(1),
(2), (4) Date: May 4, 2012

(87) PCT Pub. No.: WO2011/055196
PCT Pub. Date: May 12, 2011

(65) Prior Publication Data
US 2012/0226387 A1    Sep. 6, 2012

(30) Foreign Application Priority Data

Nov. 6, 2009    (JP) .................................. 2009-255402

(51) Int. Cl.
G05D 3/12    (2006.01)
G05D 5/00    (2006.01)
(Continued)

(52) U.S. Cl.
CPC ... H02J 3/32 (2013.01); H02J 7/35 (2013.01); Y02E 70/30 (2013.01); H02J 2003/143 (2013.01); Y02B 70/3266 (2013.01); Y04S 20/242 (2013.01)
USPC ........... 700/295; 700/291; 700/297; 320/132; 320/133; 320/134; 320/136

(58) Field of Classification Search
CPC ............ Y02T 10/7005; Y02T 10/7038; Y02T 10/7044; Y02T 90/128; Y02T 90/168; H02J 3/12; H02J 3/14; H02J 3/28; H02J 3/32; H02J 3/38–3/383; H02J 7/0047; H02J 7/0063; H02J 2007/005; B60L 11/1842; B60L 11/1861; B60L 2230/22; Y02E 10/563; Y02E 10/566; Y04S 10/54; Y04S 30/12; H04M 10/44

USPC .......... 700/286, 291, 295–297; 320/127, 128, 320/130, 132, 133–136
See application file for complete search history.

(56) References Cited

U.S. PATENT DOCUMENTS

| 8,169,183 B2 * | 5/2012 | Obayashi ....................... 320/104 |
| 8,531,161 B2 * | 9/2013 | Glauning ....................... 320/136 |
| 2013/0049695 A1 * | 2/2013 | Baba et al. .................... 320/128 |

FOREIGN PATENT DOCUMENTS

| CN | 2704931 Y | 6/2005 |
| CN | 101436785 A | 5/2009 |

(Continued)

OTHER PUBLICATIONS

Office Action dated Oct. 1, 2013 issued in corresponding Japanese application No. 2009-255402 and the English summary thereof.
(Continued)

Primary Examiner — Crystal J Barnes-Bullock
(74) Attorney, Agent, or Firm — Bacon & Thomas, PLLC (57) ABSTRACT

A power distribution system for distributing an electric power charged in a battery to a plurality of dwelling units includes a power generation device which has a independent power generation function and is configured to generate an electric power and charge the battery with at least a part of the electric power thus generated, a first control device having a residual amount measuring unit for measuring a residual amount of the electric power charged in the battery and a plurality of second control devices which are provided in a corresponding relationship with the dwelling units and make communications with the first control device. The first control device is configured to adjust an amount of the electric power supplied from the battery to the dwelling units based on a measurement result of the residual amount measuring unit and information received from each of the second control devices.

11 Claims, 4 Drawing Sheets

(51) Int. Cl.
*G05D 9/00* (2006.01)
*G05D 11/00* (2006.01)
*G05D 17/00* (2006.01)
*H02J 7/00* (2006.01)
*H02J 3/32* (2006.01)
*H02J 7/35* (2006.01)
*H02J 3/14* (2006.01)

(56) References Cited

FOREIGN PATENT DOCUMENTS

| JP | 10132910 | A | * | 5/1998 |
| JP | 10215503 | A | * | 8/1998 |
| JP | 2001184913 | A | * | 7/2001 |
| JP | 200210500 | | | 1/2002 |
| JP | 2003143763 | | | 5/2003 |
| JP | 2006191748 | | | 7/2006 |
| JP | 2009-153337 | | | 7/2009 |
| JP | 2009159730 | | | 7/2009 |
| JP | 2009159780 | | | 7/2009 |
| JP | 2010216792 | A | * | 9/2010 |

OTHER PUBLICATIONS

English translation of Search Report of Chinese Office Action dated Jan. 24, 2014.

The International Search Report for PCT/IB2010/002749.

* cited by examiner

FIG. 4

POWER DISTRIBUTION SYSTEM

FIELD OF THE INVENTION

The present invention relates to a power distribution system for distributing an electric power to individual dwelling units which form an apartment building.

BACKGROUND OF THE INVENTION

In recent years, there is proposed a technology in which a power generation device for performing an independent power generation through the use of natural energy source is installed in a house and in which an electric power generated by the power generation device is supplied to various kinds of electric appliances such as an illumination device and the like (see Patent document 1). In Patent document 1, a solar cell and a battery storing the electric power generated in the solar cell are installed in a house.

If an electric power is available from a main power supply represented by a commercial power source, the electric power is supplied from the main power source to various kinds of electric appliances. At this time, the AC power supplied from the main power source is converted to a DC voltage which in turn is supplied to electric appliances (often referred to as "DC appliances") driven by the DC voltage. On the other hand, if the electric power is not available from the main power source due to a power outage, the DC appliances are operated by the DC power supplied from a battery.

In the event that a power outage occurs in an apartment building having a plurality of dwelling units, the DC power is supplied from the battery to the respective dwelling units.

Patent document 1: Japanese Patent Application Publication No. 2009-159780

In the power distribution system disclosed in Patent document 1, the DC power charged in the battery is used when the house suffers from a power outage. In recent years, however, a strong demand exists to effectively use the DC power charged in a battery, thereby reducing the use amount of the AC power supplied from a main power source to a house.

SUMMARY OF THE INVENTION

In view of the above, the present invention provides a power distribution system capable of reducing the use amount of an AC power in individual dwelling units of an apartment building.

In accordance with an embodiment of the present invention, there is provided a power distribution system for distributing an electric power charged in a battery to a plurality of dwelling units, including: a first control device having a residual amount measuring unit for measuring a residual amount of the electric power charged in the battery. Herein, the first control device is configured to adjust an amount of the electric power supplied from the battery to the dwelling units based on a measurement result of the residual amount measuring unit.

The power distribution described above may further includes a power generation device having an independent power generation function, the power generation device being configured to generate an electric power and charge the battery with at least a part of the electric power thus generated; and a plurality of second control devices which are provided in a corresponding relationship with the dwelling units and make communications with the first control device. Herein, the first control device is configured to adjust the amount of the electric power supplied from the battery to the dwelling units based on the measurement result and information received from each of the second control devices.

With such configuration, the DC power is supplied from the battery to each of the dwelling units, according to the residual amount of the electric power charged in the battery and the information transmitted to the first control device from the corresponding second control device. Thus, the electric power is supplied from the battery to each of the dwelling units even when no electric outage occurs. It is therefore possible to reduce the amount of the AC power used in each of the dwelling units.

Further, each of the second control devices may be configured to transmit power consumption information on a power consumption amount consumed in the corresponding dwelling units to the first control device.

With such configuration, the DC power is supplied from the battery to each of the dwelling units based on the amount of the electric power used in the corresponding dwelling unit. It is therefore possible to equally reduce the amounts of the AC power used in each of the dwelling units.

Further, each of the second control devices may include a converter for converting an AC power supplied from a commercial power source to a DC power. The first control device may be configured to, during a time period in which the power generation device generates an increased amount of electric power, restrain supply of the electric power from the battery to each of the dwelling units and transmit a power supply restraining notice to each of the second control devices, and each of the second control devices may be configured to, upon receiving the power supply restraining notice, supply the DC power converted by the converter to DC appliances.

With such configuration, the electric power generated in the power generation device is supplied to the battery during the time period in which the power generation amount in the power generation device is kept large. In each of the dwelling units, the AC power supplied from the commercial power source is converted to the DC power which in turn is supplied to the DC appliances. It is therefore possible to appropriately charge the battery.

Further, the first control device may be configured to, during a time period in which the power generation device generates a reduced amount of electric power, transmit to each, of the second control devices a notice of supply permission of the electric power from the battery to each of the dwelling units, and each of the second control devices may be configured to, upon receiving the notice of the supply permission of the electric power, supply the electric power from the battery to DC appliances.

With such configuration, the DC power is supplied from the battery to each of the dwelling units during the time period in which the power generation amount in the power generation device is kept small. In each of the dwelling units, the DC appliances are operated by the electric power supplied from the battery. It is therefore possible to appropriately distribute the DC power charged in the battery to each of the dwelling units.

Further, each of the second control devices may include a converter for converting an AC power supplied from a commercial power supply to a DC power. The first control device may be configured to, if the residual amount measured by the residual amount measuring unit is smaller than a predetermined residual amount threshold, restrain supply of the electric power from the battery to each of the dwelling units and transmit a power supply restraining notice to each of the second control devices, and each of the second control devices may be configured to, upon receiving the power supply restraining notice, supply the DC power converted by the converter to DC appliances.

With such configuration, if the residual amount of the electric power charged in the battery becomes smaller than the residual amount threshold, the supply of the electric power from the battery to each of the dwelling units is restrained. It is therefore possible to prevent excessive discharge of the battery having a reduced residual power amount.

Further, the first control device may be configured to, if the residual amount measured by the residual amount measuring unit is smaller than a predetermined residual amount threshold, make the amount of the electric power supplied from the battery to each of the dwelling units become smaller than the amount of the electric power supplied from the battery to each of the dwelling units when the residual amount is equal to or larger than the predetermined residual amount threshold.

With such configuration, if the residual amount of the electric power charged in the battery becomes smaller than the residual amount threshold, the amount of the electric power supplied from the battery to each of the dwelling units is made smaller than the amount of the electric power supplied from the battery to each of the dwelling units when the residual amount is equal to or larger than the residual amount threshold. It is therefore possible to prevent excessive discharge of the battery and to reduce the amount of the AC power consumed in each of the dwelling units.

Further, each of the second control devices may include a converter for converting an AC power supplied from a commercial power supply to a DC power. The first control device may be configured to, if the residual amount measured by the residual amount measuring unit is equal to or smaller than a predetermined excessive discharge determination threshold which is smaller than the predetermined residual amount threshold, restrain supply of the electric power from the battery to each of the dwelling units and transmit a power supply restraining notice to each of the second control devices, and each of the second control devices may be configured to, upon receiving the power supply restraining notice, supply the DC power converted by the converter to DC appliances.

With such configuration, if the residual amount of the electric power charged in the battery becomes equal to or smaller than the excessive discharge determination threshold, the supply of the electric power from the battery to each of the dwelling units is restrained. It is therefore possible to prevent excessive discharge of the battery having a reduced residual power amount.

The power distribution described above may further include a third control device which corresponds to a common unit shared by the dwelling units and makes communications with the first control device. The first control device may be configured to adjust an amount of the electric power supplied from the battery to each of the dwelling units and the common unit based on the measurement result of the residual amount measuring unit, the information received from the second control devices and information received from the third control device.

With such configuration, the electric power is supplied from the battery to the common unit of an apartment building. It is therefore possible to reduce the amount of the AC power used in the common unit.

In accordance with the present invention, it is possible to reduce the amount of the AC power used in the dwelling units of an apartment building.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings, which form a part hereof. Throughout the drawings, like reference numerals will be given to like parts, and redundant description thereof will be omitted.

Figure 1:
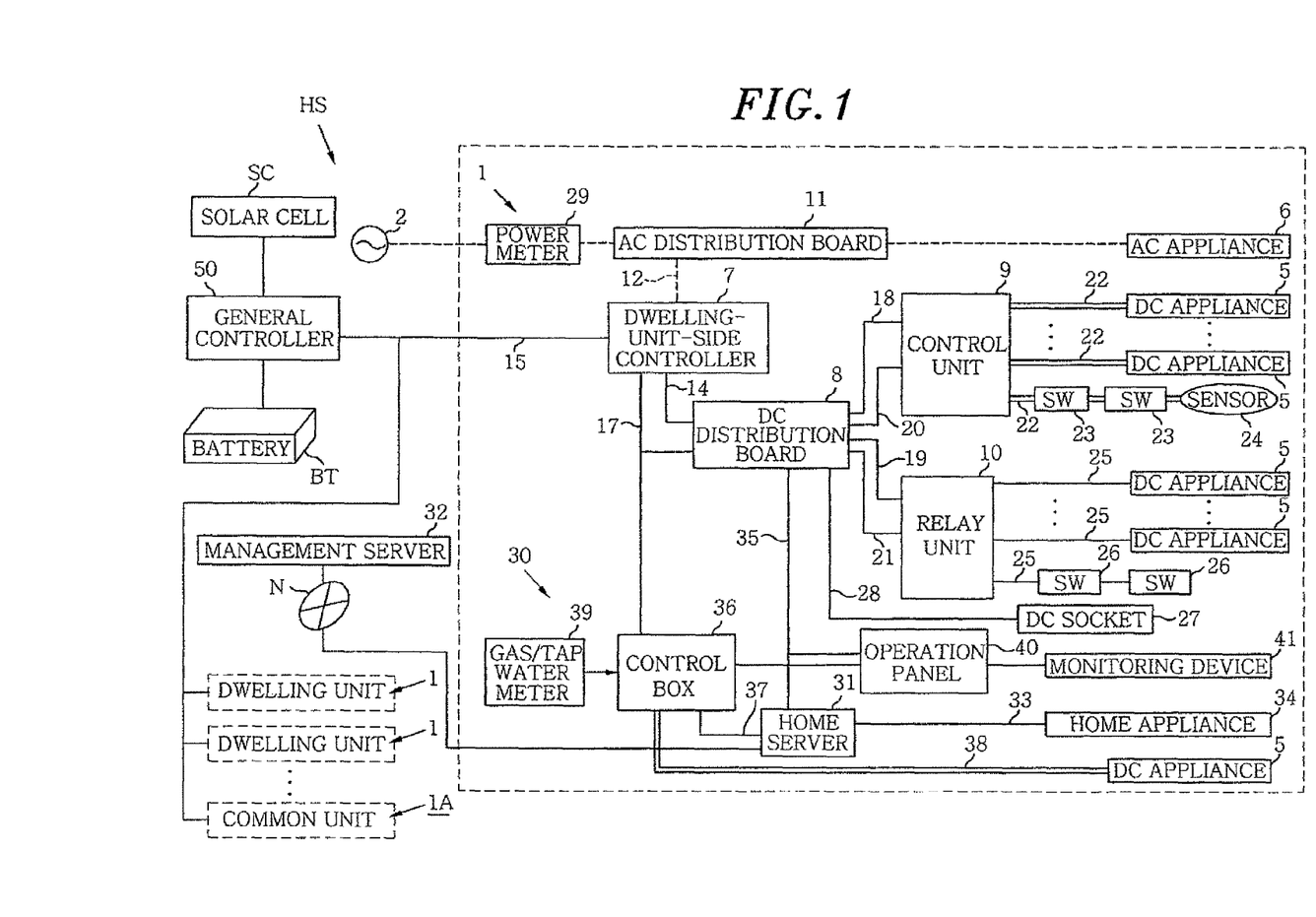
FIG. 1 is a configuration view schematically showing an apartment building power distribution system in accordance with an embodiment of the present invention.

Referring to FIG. 1, an apartment building having a plurality of dwelling units and a common unit shared by the dwelling units is provided with a power distribution system HS for adjusting the electric power supplied to the respective dwelling units and the common unit. The power distribution system HS includes a solar cell SC as a power generation device for generating an electric power with the sunlight which is an example of natural energy, a large-capacity battery BT storing and discharging the electric power generated in the solar cell SC and a general controller 50 as a first control device for distributing the DC power charged in the battery BT to the respective dwelling units and the common unit.

The power distribution system HS further includes a dwelling-unit power supply system 1 for supplying an electric power to various kinds of appliances (such as an illumination device, an air conditioner, a home appliance and an audiovisual device) installed in each of the dwelling units and a common-unit power supply system 1A for supplying an electric power to various kinds of appliance (such as an illumination device and an elevator) installed in the common unit. In the power distribution system HS, the electric power to be charged in the battery BT may not be supplied from the solar cell SC serving as a power generation device but may be supplied from a commercial AC power source 2 through the dwelling-unit-side controller 7 and the general controller 50. The apartment building referred to herein means, e.g., a building within which a plurality of offices, stores or dwelling units.

Next, the general controller 50 will be described with reference to FIGS. 1 and 2.

Figure 2:
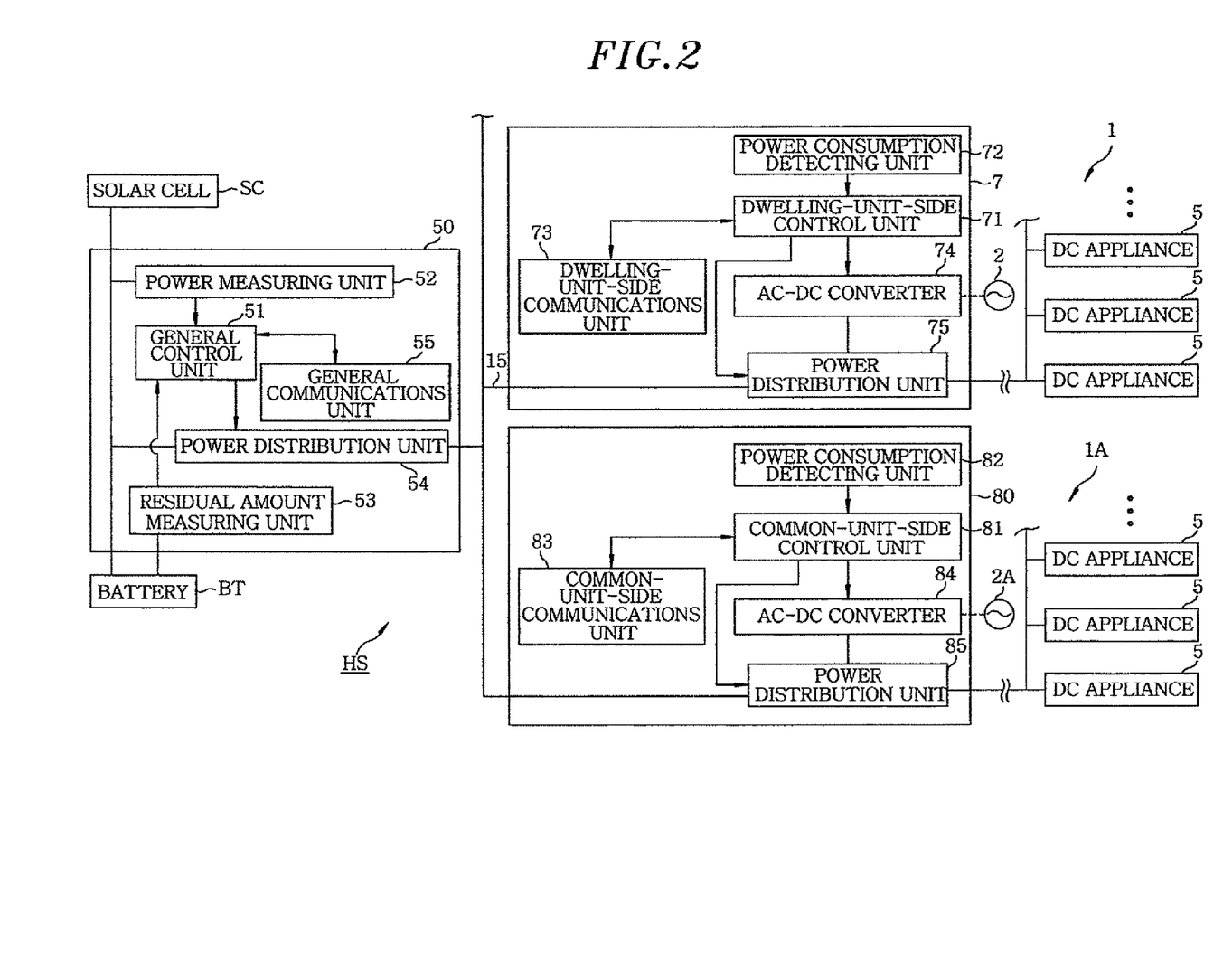
FIG. 2 is a configuration view schematically showing main parts of the power distribution system.

As shown in FIGS. 1 and 2, the solar cell SC installed on the roof of the apartment building and the battery BT are electrically connected to the general controller 50. The general controller 50 supplies the electric power generated in the solar cell SC to the battery BT to charge the battery BT or transmits the electric power generated in the solar cell SC to a power company to sell the electric power.

The general controller 50 includes a general control unit 51, a power measuring unit 52 for measuring an amount of an electric power generated in the solar cell SC and a residual amount measuring unit 53 serving as a residual amount measuring means for measuring the residual amount of an electric power charged in the battery BT. The general controller 50 further includes a power distribution unit 54 for distributing the electric power supplied from the battery BT to the respective dwelling units and the common unit and a general communications unit 55 for making wireless communications with the dwelling-unit-side controller 7 of each of the dwelling units and a common-unit-side controller 80 of the common unit.

The general control unit 51 includes a digital computer having a CPU, a ROM and a RAM not shown in the drawings. The measurement results of the power measuring unit 52 and the residual amount measuring unit 53 and the results received by the general communications unit 55 are inputted to the general control unit 51. The general control unit 51 outputs control instructions to the power distribution unit 54 to independently control the amounts of the DC power supplied from the battery BT to the respective dwelling units and the common unit.

Each of the power measuring unit 52 and the residual amount measuring unit 53 includes a DC power meter (not shown) and a computation unit (not shown) for computing an electric energy amount based on a measurement signal outputted from the DC power meter. Each of the power measuring unit 52 and the residual amount measuring unit 53 outputs the computation result of the computation unit (that is, the information on the power generation amount of the solar cell SC and the residual power amount of the battery BT) to the general control unit 51.

The power distribution unit 54 is connected to the dwelling-unit-side controller 7 and the common-unit-side controller 80 through a DC power line 15. The power distribution unit 54 includes adjusting units (e.g., variable resistors) (not shown) for adjusting the amounts of the DC power supplied from the battery BT to the respective dwelling units and the common unit; and switching units for permitting or restraining the supply of the DC power from the battery BT to the respective dwelling units and the common unit. The adjusting units and the switching units of the power distribution unit 54 are provided in a corresponding relationship with the respective dwelling units and the common unit. Further, the adjusting units and the switching units are operated based on the control instructions transmitted from the general control unit 51.

Next, the dwelling-unit power supply system 1 will be described with reference to FIG. 1.

As shown in FIG. 1, the power supply system 1 supplies the commercial alternating current power (AC power) obtained from the commercial AC power source 2 as a power source to operate various kinds of appliances and also supplies the electric power (the DC power) supplied from the solar cell SC and the battery BT as a power source to the various kinds of appliances. The power supply system 1 supplies the electric power not only to DC appliances 5 operated with the DC power inputted thereto but also to AC appliances 6 operated with the AC power inputted thereto.

The power supply system 1 includes a dwelling-unit-side controller 7 as a second control device and a DC distribution board 8 (having a DC breaker installed therein). The power supply system 1 further includes a relay unit 10 and a control unit 9 for controlling the operations of the DC appliances 5 of each of the dwelling units.

An AC distribution board 11 for distributing the AC power is connected to the dwelling-unit-side controller 7 through an AC power line 12. The dwelling-unit-side controller 7 is connected to the commercial AC power source 2 through the AC distribution board 11 and is connected to the general controller 50 (more specifically, the battery ET) through the DC power line 15. The dwelling-unit-side controller 7 is supplied with the AC power from the AC distribution board 11 and is supplied with the DC power from the general controller 50. The dwelling-unit-side controller 7 converts the AC power and the DC power to a specified DC power to be supplied to the appliances. The DC power thus converted is outputted to the DC distribution board 8 through a DC power line 14. The dwelling-unit-side controller 7 exchanges data with the DC distribution board 8 through a signal line 17.

The DC distribution board 8 is a kind of breaker for the DC power. The DC distribution board 8 divides the DC power inputted from the dwelling-unit-side controller 7. The DC power thus divided is outputted to the control unit 9 through a DC power line 18 or to the relay unit 10 through a DC power line 19. The DC distribution board 8 exchanges data with the control unit 9 through a signal line 20 or with the relay unit 10 through a signal line 21.

The DC appliances 5 are connected to the control unit 9. The DC appliances 5 are connected to the control unit 9 through DC supply lines 22 each of which has a pair of lines capable of transmitting both the DC power and the data therethrough. The electric power and the data are transmitted to the DC appliances 5 through the respective DC supply lines 22 by virtue of so-called power line communications in which communications signals for transmitting data with high-frequency carrier waves are overlapped with the DC power to be supplied to the DC appliances 5 by using a pair of lines. The control unit 9 receives the DC power for the DC appliances 5 through the DC power line 18. Based on the operation instruction obtained from the DC distribution board 8 through the signal line 20, the control unit 9 determines which of the DC appliances 5 is to be controlled in what manner. Then, the control unit 9 outputs a DC voltage and the operation instruction to the designated DC appliances 5 through the corresponding DC supply lines 22, thereby controlling the operations of the DC appliances 5.

Switches 23 operated to switch over the operations of the DC appliances 5 are connected to the control unit 9 through the DC supply line 22. In addition, a sensor 24 for detecting electric waves transmitted from, e.g., an infrared remote controller is connected to the control unit 9 through the DC supply line 22. Accordingly, the DC appliances 5 are controlled by transmitting communications signals through the DC supply lines 22 in response to not only the operation instruction obtained from the DC distribution board 8 but also to the operation of the switches 23 and the detection in the sensor 24.

The DC appliances 5 are connected to the relay unit 10 through individual DC power lines 25. The relay unit 10 obtains the DC power for the DC appliances 5 through the DC power line 19. Based on the operation instruction obtained from the DC distribution board 8 through the signal line 21, the relay unit 10 determines which of the DC appliances 5 is to be operated.

The relay unit 10 controls the operations of the DC appliances 5 in such a way that the relays installed therein turn on and off the supply of powers to the designated DC appliances 5 through the DC power lines 25. Switches 26 for use in manually switching the operations of the DC appliances 5 are connected to the relay unit 10. The DC appliances 5 are controlled by manually operating the switches 26 to cause the relays to turn on and off the supply of powers to the DC power lines 25

A DC socket 27 installed in each of the dwelling units in the form of e.g., a wall socket or a floor socket is connected to the DC distribution board 8 through a DC power line 28. If a plug (not shown) of one of the DC appliances 5 is inserted into the DC socket 27, it becomes possible to directly supply the DC power to the corresponding DC appliance.

A power meter 29 capable of remotely measuring the use amount of the electric power used by the commercial AC power source 2 is connected between the commercial AC power source 2 and the AC distribution board 11. The power meter 29 has a function of the power line communications or wireless communications as well as the function of remotely measuring the use amount of the electric power used by the commercial AC power source 2. The power meter 29 transmits the measurement results to a power company or the like through the power line communications or the wireless communications.

The power supply system 1 includes a network system 30 that makes it possible to control various kinds of home appliances through network communications. The network system 30 includes a home server 31 as a control unit thereof. The home server 31 is connected to an outdoor management server 32 through a network N such as the Internet or the like and is connected to a home appliance 34 through a signal line 33. The home server 31 is operated by the DC power obtained from the DC distribution board 8 through a DC power line 35.

A control box 36 for managing the operation control of various kinds of home appliances by network communications is connected to the home server 31 through a signal line 37. The control box 36 is connected to the dwelling-unit-side controller 7 and the DC distribution board 8 through a signal line 17 and is capable of directly controlling the DC appliances 5 through a DC power line 38. A gas/tap water meter 39 capable of remotely reading, e.g., the amounts of the gas and the tap water used, is connected to the control box 36. The control box 36 is connected to an operation panel 40 of the network system 30. A monitoring device 41 formed of, e.g., a door phone extension unit, a sensor or a camera is connected to the operation panel 40.

If operation instructions for operating various kinds of home appliances are inputted through the network N, the home server 31 notifies the control box 36 of the operation instructions and operates the control box 36 so that the various kinds of home appliances can make operation based on the operation instructions. Moreover, the home server 31 can provide various kinds of information obtained from the gas/tap water meter 39 to the management server 32 through the network N. Upon receiving the abnormality detection information from the monitoring device 41 through the operation panel 40, the home server 31 provides an information reception notice to the management server 32 through the network N.

Next, the dwelling-unit-side controller 7 will be described with reference to FIG. 2. In FIG. 2, only the main parts of the present embodiment connected to the dwelling-unit-side controller 7 are shown, and description of the remaining parts will be omitted.

As shown in FIG. 2, the dwelling-unit-side controller 7 includes a dwelling-unit-side control unit 71, a power consumption detecting unit 72 for detecting the current power consumption amount in each of the dwelling units and a dwelling-unit-side communications unit 73 for transmitting and receiving different kinds of information to and from the general communications unit 55 of the general control unit 51. The dwelling-unit-side controller 7 further includes an AC-DC converter 74 as a converter unit for converting the AC power supplied from the commercial AC power source 2 to the DC power and a power distribution unit 75 for adjusting the supply pattern of the DC power supplied to the respective DC appliances 5.

The dwelling-unit-side control unit 71 includes a digital computer having a CPU, a ROM and a RAM not shown in the drawings. The dwelling-unit-side control unit 71 operates the AC-DC converter 74 and the power distribution unit 75 based on the information inputted from the general controller 50 through the dwelling-unit-side communications unit 73. Moreover, the dwelling-unit-side control unit 71 causes the dwelling-unit-side communications unit 73 to transmit the information on the current power consumption amount in each of the dwelling units detected by the power consumption detecting unit 72 (hereinafter referred to as "power consumption information") to the general communications unit 55. In the present embodiment, the power consumption information contains the information on the total sum of the power consumption amounts of the DC appliances 5 in each of the dwelling units.

The power consumption detecting unit 72 includes detector units (not shown) for individually detecting the power consumption amounts of the DC appliances 5 provided in each of the dwelling units. The detector units are arranged in the respective DC appliances 5. The power consumption detecting unit 72 further includes a computation unit (not shown) for summing up the power consumption amounts of the respective DC appliances 5 detected by the individual detector units to acquire the total power consumption amount in each of the dwelling units. The power consumption amount in each of the dwelling units computed by the computation unit is outputted to the dwelling-unit-side control unit 71.

Next, the common-unit power supply system 1A will be described with reference to FIGS. 1 and 2.

As shown in FIGS. 1 and 2, the power supply system 1A supplies the commercial AC power obtained from the commercial AC power source 2A to operate various kinds of appliances and also supplies the electric power supplied from the solar cell SC and the battery BT to the various kinds of appliances. The power supply system 1A supplies the electric power not only to DC appliances (such as illumination devices and the like) 5 operated with the DC power inputted thereto but also to AC appliances (such as an elevator and the like) (not shown) operated with the AC power inputted thereto.

The power supply system 1A includes a common-unit-side controller 80 as a third control device and a DC distribution board (not shown). The power supply system 1A further includes a relay unit and a control unit for controlling the operations of the DC appliances 5 of the common unit, both of which are not shown in the drawings. The respective DC appliances 5 are connected to the control unit and the relay unit.

The common-unit-side controller 80 includes a common-unit-side control unit 81, a power consumption detecting unit 82 for detecting the current power consumption amount in the common unit (that is, the total sum of the power consumption amounts of the respective DC appliances 5) and a common-unit-side communications unit 83 for transmitting and receiving different kinds of information to and from the general communications unit 55 of the general control unit 51. The common-unit-side controller 80 further includes an AC-DC converter 84 for converting the AC power supplied from the commercial AC power source 2A to the DC power and a power distribution unit 85 for adjusting the supply pattern of the DC power supplied to the respective DC appliances 5.

The common-unit-side control unit 81 includes a digital computer having a CPU, a ROM and a RAM not shown in the drawings. The common-unit-side control unit 81 operates the AC-DC converter 84 and the power distribution unit 85 based on the information inputted from the general controller 50 through the common-unit-side communications unit 83. Moreover, the common-unit-side control unit 81 causes the common-unit-side communications unit 83 to transmit the information on the current power consumption amount in the common unit detected by the power consumption detecting unit 82 to the general communications unit 55.

Figure 3:
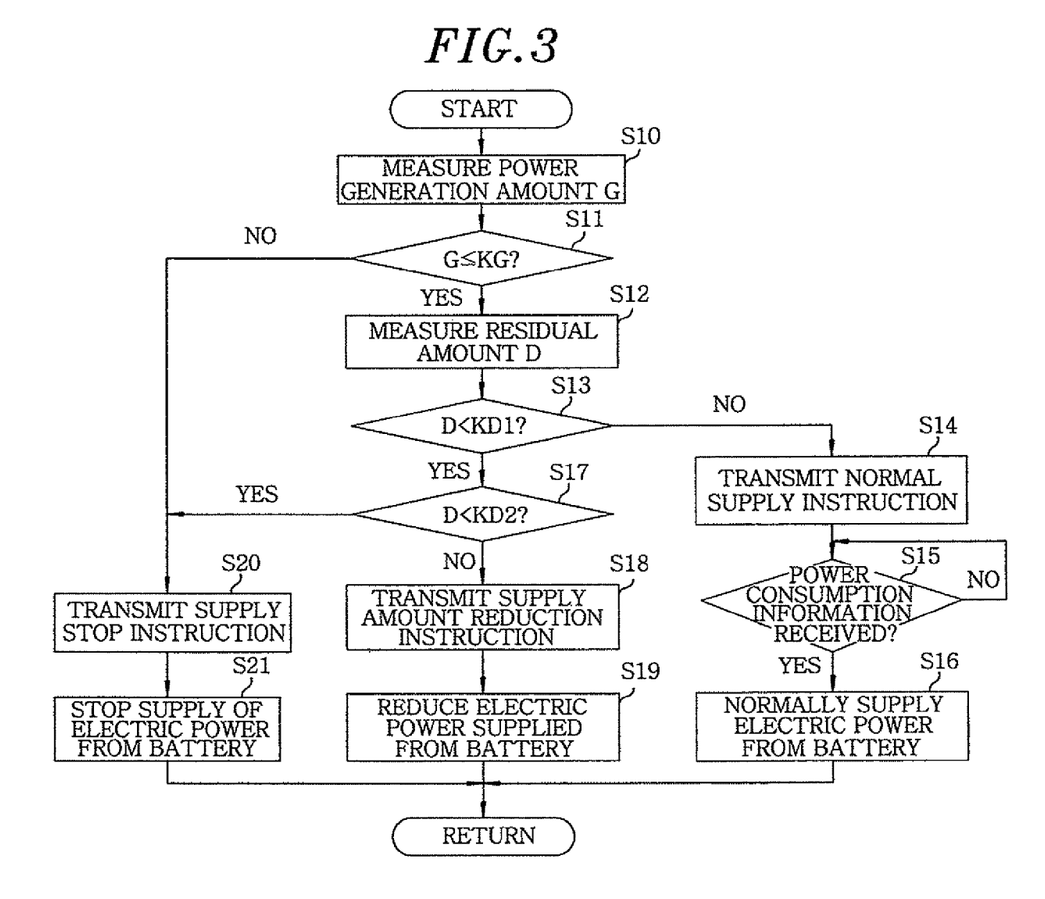
FIG. 3 is a flowchart illustrating a power distribution processing routine executed in a general controller of the power distribution system.

Next, a power distribution processing routine executed by the general controller 50 will be described with reference to a flowchart shown in FIG. 3.

The general control unit 51 executes a power distribution processing routine at a predetermined time interval (e.g., at a time interval of several milliseconds). In the power distribution processing routine, the general control unit 51 causes the power measuring unit 52 to measure the power generation amount G in the solar cell SC, thus acquiring the measurement result from the power measuring unit 52 (step S10). The general control unit 51 determines whether the power generation amount G acquired in step S10 is not greater than a predetermined power generation amount threshold KG (step S11). The power generation amount threshold KG is a reference value for determining whether the present time belongs to the time period (e.g., the nighttime) in which the power generation amount G in the solar cell SC is kept small. The power generation amount threshold KG is set in advance by tests and simulations. If the determination result is 'NO' in step S11 (if G>KG), the general control unit 51 determines that the present time belongs to the time period (e.g., the daytime) in which the power generation amount G in the solar cell SC is kept large. Then, the processing flow proceeds to step S20 where the battery BT is charged with the electric power generated in the solar cell SC.

If the determination result is 'YES' in step S11 (if G≤KG), the general control unit 51 determines that the present time belongs to the time period (e.g., the nighttime) in which the power generation amount G in the solar cell SC is kept small. The general control unit 51 causes the residual amount measuring unit 53 to measure the residual amount D of the electric power in the battery BT, thus acquiring the measurement result from the residual amount measuring unit 53 (step S12). Then the general control unit 51 determines whether the residual amount D acquired in step S12 is smaller than a predetermined first residual amount threshold KD1 (e.g., a value corresponding to 50% of a fully charged amount) (step S13). The first residual amount threshold KD1 is a reference value set to prevent excessive discharge of the battery BT and is set in advance by tests or simulations.

If the determination result is 'NO' in step S13 (if D≥KD1), the general control unit 51 determines that the battery ET is charged with a sufficient amount of electric power. The general control unit 51 causes the general communications unit 55 to transmit a normal supply instruction to the respective dwelling units and the common unit (step S14). Subsequently, the general control unit 51 determines whether the power consumption information is received from the respective dwelling units (the respective dwelling-unit-side communications units 73) and the common unit (the common-unit-side communications unit 83) (step S15). If the determination result is 'NO' in step S15, the general control unit 51 repeatedly executes the determination processing of step S15 until the power consumption information is received. This is because the current power consumption amounts in the respective dwelling units and the common unit are unclear.

On the other hand, if the determination result is 'YES' in step S15, the general control unit 51 operates the power distribution unit 54 such that the electric power is normally supplied from the battery BT (step S16). More specifically, the general control unit 51 operates the power distribution unit 54 so that the DC power depending on the power consumption amounts in the respective dwelling units and the common unit can be supplied to the respective dwelling units and the common unit. As s result, all the DC appliances 5 of the respective dwelling units and the common unit are operated by the DC power supplied from the battery BT. Thereafter, the general control unit 51 terminates the power distribution processing routine.

If the determination result is 'YES' in step S13 (if D<KD1), the general control unit 51 determines that the residual amount D of the electric power in the battery BT is small. Then, the general control unit 51 determines whether the residual amount D acquired in step S12 is smaller than a predetermined second residual amount threshold (excessive discharge determining threshold) KD2 (step S17). The second residual amount threshold KD2 is a reference value for determining whether to restrain any further discharge of the battery BT and is set smaller than the first residual amount threshold KD1 (e.g., equal to 10% of a fully charged amount).

If the determination result is 'YES' in step S17 (if D<KD2), the processing flow in the general control unit 51 proceeds to step S20 to be set forth later.

If the determination result is 'NO' in step S17 (if D≥KD2), the general control unit 51 causes the general communications unit 55 to transmit a supply amount reduction instruction to the respective dwelling units and the common unit so as to reduce the discharge amount in the battery BT (step S18). Then, the general control unit 51 operates the power distribution unit 54 so that the supply amount of the electric power supplied from the battery BT to the respective dwelling units and the common unit can be smaller than the supply amount of the electric power when the residual amount D is equal to or greater than the first residual amount threshold KD1 (step S19). As one example, the general control unit 51 operates the power distribution unit 54 so that about one half of the electric power amount required in the respective dwelling units and the common unit can be supplied to the respective dwelling units and the common unit. Thereafter, the general control unit 51 terminates the power distribution processing routine.

In step S20, the general control unit 51 causes the general communications unit 55 to transmit a supply stop instruction to the respective dwelling units and the common unit in order to restrain the discharge of the battery BT. Then the general control unit 51 operates the power distribution unit 54 so as to stop the supply of the electric power from the battery BT to the respective dwelling units and the common unit (step S21). Thereafter, the general control unit 51 terminates the power distribution processing routine.

Figure 4:
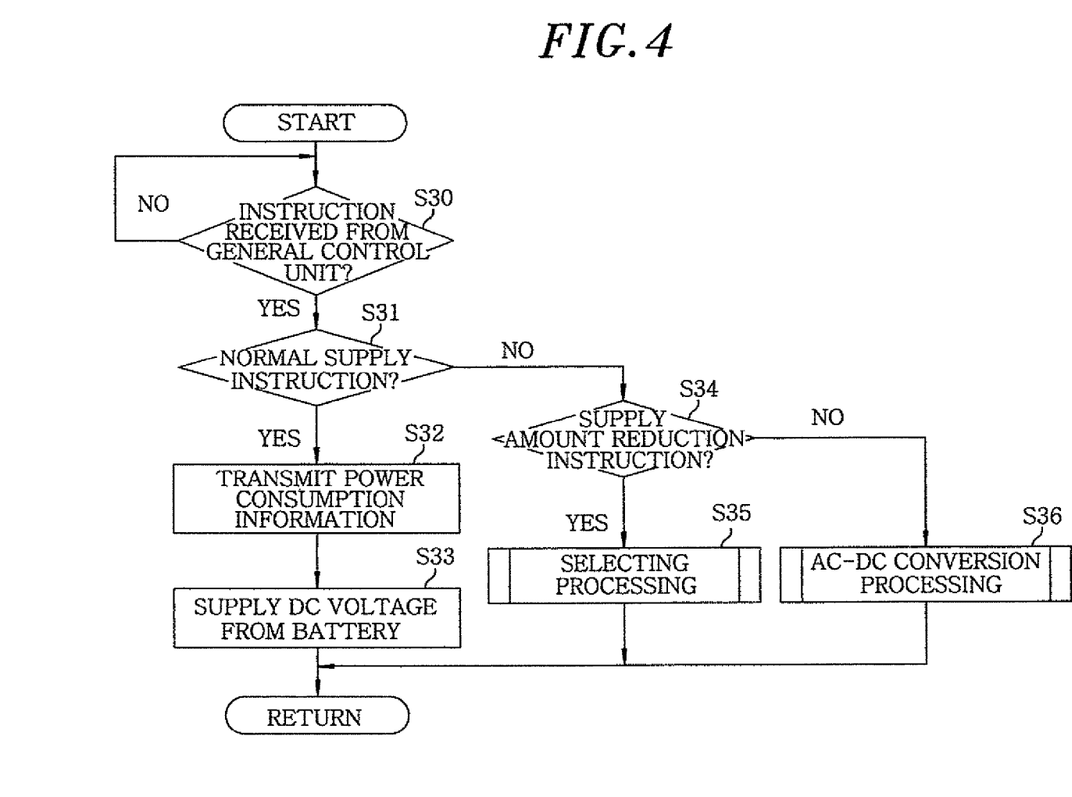
FIG. 4 is a flowchart illustrating a power adjustment processing routine executed in a dwelling-unit-side control unit and a common-unit-side control unit of the power distribution system.

Next, a power adjustment processing routine executed by the dwelling-unit-side controller 7 and the common-unit-side controller 80 will be described with reference to a flowchart shown in FIG. 4. Since the common-unit-side controller 80 executes the same processing as executed by the dwelling-unit-side controller 7, description will be made herein on the power adjustment processing routine executed by the dwelling-unit-side controller 7.

The dwelling-unit-side control unit 71 executes the power distribution processing routine at a predetermined time interval (e.g., at a time interval of several milliseconds). In the power adjustment processing routine, the dwelling-unit-side control unit 71 determines whether the dwelling-unit-side communications unit 73 has received an instruction (one of the normal supply instruction, the supply amount reduction instruction and the supply stop instruction) from the general control unit 51 (step S30). If the determination result is 'NO', the dwelling-unit-side control unit 71 repeatedly executes the determination processing of step S30 until any one of the instructions is received. On the other hand, if the determination result is 'YES' in step S30, the dwelling-unit-side control unit 71 determines whether the instruction received by the dwelling-unit-side communications unit 73 is the normal supply instruction (step S31).

If the determination result is 'YES' (if the normal supply instruction is received), the dwelling-unit-side control unit 71 causes the power consumption detecting unit 72 to detect the power consumption amounts in the dwelling units and causes the dwelling-unit-side communications unit 73 to transmit the power consumption information on the detected power consumption amounts to the general communications unit 55 of the general controller 50 (step S32). Subsequently, the dwelling-unit-side control unit 71 operates the AC-DC converter 74 and the power distribution unit 75 so that the DC power supplied from the battery BT can be distributed to the respective DC appliances 5 while restraining the supply of the AC voltage from the commercial AC power source 2 (step S33). Thereafter, the power adjustment processing routine comes to an end.

On the other hand, if the determination result is 'NO' in step S31 (if the normal supply instruction is not received), the dwelling-unit-side control unit 71 determines whether the instruction received by the dwelling-unit-side communications unit 73 is the supply amount reduction instruction (step S34). If the determination result is 'YES' (if the supply amount reduction instruction is received), the dwelling-unit-side control unit 71 executes a selecting processing (step S35).

More specifically, if only one of the DC appliances 5 is being used in a dwelling unit, the dwelling-unit-side control unit 71 operates the power distribution unit 75 so as to stop the supply of the electric power to the relevant DC appliance 5 and notifies a resident of the power supply stop notice. If a plurality of the DC appliances 5 is being used in the dwelling unit, the dwelling-unit-side control unit 71 operates the power distribution unit 75 so as to stop the supply of the electric power to some of the DC appliances 5 and outputs a power supply stop notice to the DC distribution board 8, the control unit 9 and the rely unit 10.

At this time, the dwelling-unit-side control unit 71 restrains the supply of the AC voltage from the commercial AC power source 2. Thus, the remaining DC appliances 5 are operated by the DC power supplied from the battery BT. The supply and non-supply of the DC power to the DC appliances 5 is decided by a specified threshold (e.g., the use amount of the DC power). Thereafter, the dwelling-unit-side control unit 71 terminates the power adjustment processing routine.

On the other hand, if the determination result is 'NO' in step S34 (if the supply amount reduction instruction is not received), the dwelling-unit-side control unit 71 determines that the instruction received by the dwelling-unit-side communications unit 73 is the supply stop instruction and causes the AC-DC converter 74 to execute AC-DC conversion processing (step S36). More specifically, the dwelling-unit-side control unit 71 causes the AC-DC converter 74 to convert the AC power supplied from the commercial AC power source 2 to the DC power and operates the power distribution unit 75 so as to distribute the converted DC power to the respective DC appliances 5. At this time, all the appliances in the dwelling unit are operated by the AC power. Thereafter, the dwelling-unit-side control unit 71 terminates the power adjustment processing routine.

For example, if the battery BT is sufficiently changed by the solar cell SC during the daytime, the DC appliances 5 of the respective dwelling units and the common unit are operated in the nighttime by the DC power supplied from the battery BT. Since the AC power is not used in the nighttime to operate the DC appliances 5 of the respective dwelling units and the common unit, it is possible to reduce the use amount of the AC power supplied from the commercial AC power source 2. In addition, the DC power depending on the power consumption information transmitted from the dwelling-unit-side communications unit 73 and the common-unit-side communications unit 83 is supplied from the battery BT to the respective dwelling units and the common unit. This makes it possible to equally reduce the use amount of the AC power used in the respective dwelling units.

If the residual amount D of the electric power in the battery BT becomes smaller than the first residual amount threshold KD1 over time, it is determined that the residual amount D is not enough. Then, the DC power supplied from the battery BT to the respective dwelling units and the common unit grows smaller than the DC power previously supplied to the respective dwelling units.

In order to cope with the reduction in the supply amount of the DC power supplied from the battery BT, a selecting processing is executed in the respective dwelling units and the common unit. As one example, if a plurality of the DC appliances 5 is being used in a dwelling unit, the supply of the DC power to some of the DC appliances 5 is compulsorily stopped while normally supplying the DC power to the remaining DC appliances 5. As a result, the consumption amount of the DC power in the dwelling unit is reduced in keeping with the reduction in the supply amount of the DC power supplied from the battery BT. At this time, it may be also possible to reduce the supply amount of the DC power supplied to the remaining DC appliances 5.

Thereafter, if the time is further lapsed, it is sometimes the case that the residual amount D of the electric power in the battery BT becomes smaller than the second residual amount threshold KD2. In this case, the supply of the DC power from the battery BT to the respective dwelling units and the common unit is compulsorily restrained. Thus, the DC power is no longer supplied from the battery BT to the respective dwelling units and the common unit. Accordingly, the AC power supplied from the commercial AC power sources 2 and 2A is converted to the DC power by the AC-DC converters 74 and 84 and is then supplied to the DC appliances 5. This makes it possible to avoid occurrence of a situation that the DC appliances 5 become unusable in the respective dwelling units and the common unit.

At this time, it becomes possible to prevent the battery BT from being completely discharged. The electric power remaining a little in the battery BT can be used as an emergency power in the event of electric outage occurring in the apartment building.

With the present embodiment, the following effects can be obtained.

(1) The DC power is supplied from the battery BT to the respective dwelling units, according to the residual amount D of the electric power charged in the battery BT and the information transmitted from the dwelling-unit-side controller 7. Thus, the electric power is supplied from the battery BT to the respective dwelling units even when no electric outage occurs. It is therefore possible to reduce the amount of the AC power used in the respective dwelling units.

(2) The DC power is supplied from the battery BT to the respective dwelling units, according to the power consumption information transmitted from the dwelling-unit-side controller 7. In other words, the DC power is supplied from the battery BT to the respective dwelling units based on how much DC power is consumed. It is therefore possible to equally reduce the amounts of the AC power used in the respective dwelling units.

(3) During the time period in which the power generation amount G in the solar cell SC is kept large, the electric power generated by the solar cell SC is supplied to the battery BT and charged in the battery BT. It is therefore possible to reliably charge the battery BT during the daytime.

(4) During the time period (e.g., the nighttime) in which the power generation amount G in the solar cell SC is kept small, the DC power is supplied from the battery BT to the respective dwelling units. In each of the dwelling units, the DC power from the battery BT is supplied to the DC appliances 5, thereby operating the DC appliances 5. It is therefore possible to appropriately distribute the DC power charged in the battery BT to the respective dwelling units.

(5) If the residual amount D of the electric power charged in the battery BT becomes smaller than the first residual amount threshold KD1, the amount of the DC power supplied from the battery BT to the respective dwelling units is reduced. At this time, the selecting processing stated above is executed in the respective dwelling units to reduce the power consumption amount. It is therefore possible to restrain excessive discharge of the battery BT and to reduce the amount of the AC power consumed in the respective dwelling units.

(6) Thereafter, if the residual amount D of the electric power charged in the battery BT becomes equal to or smaller than the second residual amount threshold KD2, the supply of the electric power from the battery BT to the respective dwelling units is restrained. It is therefore possible to restrain excessive discharge of the battery BT having a reduced residual power amount.

(7) In the present embodiment, the DC power is supplied from the battery BT not only to the respective dwelling units but also to the common unit of the apartment building. It is therefore possible to reduce the amount of the AC power used in the common unit.

The present embodiment may be modified to other alternative embodiments as described below.

In an alternative embodiment, the DC power may not be supplied from the battery BT to the common unit. In this case, all the electric appliances of the common unit are operated by the AC power supplied from the commercial AC power supply.

In an alternative embodiment, if the residual amount D of the electric power charged in the battery BT becomes smaller than the first residual amount threshold KD1 and if the amount of the DC power supplied from the battery BT to the respective dwelling units and the common unit gets reduced, only the amount of the AC power corresponding to the reduction amount of the DC power supplied from the battery BT may be used in the respective dwelling units and the common unit. With this configuration, it is possible to reduce the amount of the AC power used in the respective dwelling units, as compared with a case where the DC power is not supplied from the battery BT to the respective dwelling units.

In an alternative embodiment, if the determination result is 'YES' in step S13 (if D<KD1), the processing of step S20 may be executed. In this case, it is possible to omit the processing of steps S17, S18 and S19.

In an alternative embodiment, the electric power generated in the solar cell SC may be partially supplied to the respective dwelling units and the common unit even in the time period in which the power generation amount G in the solar cell SC becomes equal to or larger than the power generation amount threshold KG. In this case, only the amount of the AC power corresponding to the amount of the DC power not covered by the solar cell SC is used in the respective dwelling units and the common unit.

In an alternative embodiment, if the DC power is supplied from the battery BT to the respective dwelling units, it may be possible to supply the DC power to the AC appliance 6. In this case, the DC power supplied from the battery BT is converted to the AC power which in turn is supplied to the AC appliance 6. This assists in further reducing the amount of the AC power supplied from the commercial AC power supply to the respective dwelling units.

In an alternative embodiment, the general control unit 51 may receive the information on the date and time and the information on the weather. Based on the information thus received, the general control unit 51 may determine the time period in which the power generation amount G in the solar cell SC is kept large or small. In this case, the general control unit 51 for estimating the power generation amount G in the solar cell SC based on the date and time information and the weather information serves as a residual amount measuring unit.

In an alternative embodiment, the power generation device may be an arbitrary one as long as it can generate an electric power using natural energy. For example, the power generation device may be a device having a wind power generation function or a geothermal power generation function. In addition, a fuel cell for generating an electric power using a reverse reaction of the electrolysis of water may be used as the power generation device.

In an alternative embodiment, the information may be transmitted and received between the general controller 50, the dwelling-unit-side controller 7 and the common-unit-side controller 80 through wire communications.

While the foregoing embodiments are directed to the supply of the electric power in a building where offices, stores and dwelling units coexist, the present invention may be applied to the power supply to a plurality of independent buildings (e.g., independent houses) and a common unit existing in a single unit area.

While the invention has been shown and described with respect to the embodiments, it will be understood by those skilled in the art that various changes and modification may be made without departing from the scope of the invention as defined in the following claims.

What is claimed is:

1. A power distribution system for distributing an electric power charged in a battery to a plurality of dwelling units, comprising:
   a first control device including a residual amount measuring unit for measuring a residual amount of the electric power charged in the battery,
   wherein the first control device is configured to adjust an amount of the electric power supplied from the battery to the dwelling units based on a measurement result of the residual amount measuring unit.

2. The power distribution system of claim 1, further comprising:
   a power generation device having an independent power generation function, the power generation device being configured to generate an electric power and charge the battery with at least a part of the electric power thus generated; and a plurality of second control devices which are provided in a corresponding relationship with the dwelling units and make communications with the first control device, wherein the first control device is configured to adjust the amount of the electric power supplied from the battery to the dwelling units based on the measurement result and information received from each of the second control devices.

3. The power distribution system of claim 2, wherein each of the second control devices is configured to transmit power consumption information on a power consumption amount consumed in the corresponding dwelling unit to the first control device.

4. The power distribution system of claim 3, wherein each of the second control devices includes a converter for converting an AC power supplied from a commercial power source to a DC power, wherein the first control device is configured to, during a time period in which the power generation device generates an increased amount of electric power, restrain supply of the electric power from the battery to each of the dwelling units and transmit a power supply restraining notice to each of the second control devices, and wherein each of the second control devices is configured to, upon receiving the power supply restraining notice, supply the DC power converted by the converter to DC appliances.

5. The power distribution system of claim 4, wherein the first control device is configured to, if the residual amount measured by the residual amount measuring unit is smaller than a predetermined residual amount threshold, restrain supply of the electric power from the battery to each of the dwelling units and transmit a power supply restraining notice to each of the second control devices, and wherein each of the second control devices is configured to, upon receiving the power supply restraining notice, supply the DC power converted by the converter to DC appliances.

6. The power distribution system of claim 4, wherein the first control device is configured to, if the residual amount measured by the residual amount measuring unit is equal to or smaller than a predetermined excessive discharge determination threshold restrain supply of the electric power from the battery to each of the dwelling units and transmit a power supply restraining notice to each of the second control devices, and wherein each of the second control devices is configured to, upon receiving the power supply restraining notice, supply the DC power converted by the converter to DC appliances.

7. The power distribution system of claim 3, wherein the first control device is configured to, during a time period in which the power generation device generates a reduced amount of electric power, transmit to each of the second control devices a notice of supply permission of the electric power from the battery to each of the dwelling units, and wherein each of the second control devices is configured to, upon receiving the notice of the supply permission of the electric power, supply the electric power from the battery to DC appliances.

8. The power distribution system of claim 2, wherein each of the second control devices includes a converter for converting an AC power supplied from a commercial power supply to a DC power, wherein the first control device is configured to, if the residual amount measured by the residual amount measuring unit is smaller than a predetermined residual amount threshold, restrain supply of the electric power from the battery to each of the dwelling units and transmit a power supply restraining notice to each of the second control devices, and wherein each of the second control devices is configured to, upon receiving the power supply restraining notice, supply the DC power converted by the converter to DC appliances.

9. The power distribution system of claim 2, wherein the first control device is configured to, if the residual amount measured by the residual amount measuring unit is smaller than a predetermined residual amount threshold, make the amount of the electric power supplied from the battery to each of the dwelling units become smaller than the amount of the electric power supplied from the battery to each of the dwelling units when the residual amount is equal to or larger than the predetermined residual amount threshold.

10. The power distribution system of claim 2, wherein each of the second control devices includes a converter for converting an AC power supplied from a commercial power supply to a DC power, wherein the first control device is configured to, if the residual amount measured by the residual amount measuring unit is equal to or smaller than a predetermined excessive discharge determination threshold restrain supply of the electric power from the battery to each of the dwelling units and transmit a power supply restraining notice to each of the second control devices, and wherein each of the second control devices is configured to, upon receiving the power supply restraining notice, supply the DC power converted by the converter to DC appliances.

11. The power distribution system of claim 2, further comprising:

a third control device which corresponds to a common unit shared by the dwelling units and makes communications with the first control device, wherein the first control device is configured to adjust an amount of the electric power supplied from the battery to each of the dwelling units and the common unit based on the measurement result of the residual amount measuring unit, the information received from the second control devices and information received from the third control device.

* * * * *